United States Patent [19]
Sandgren

[11] 3,987,533
[45] Oct. 26, 1976

[54] METHOD AND APPARATUS FOR MANUFACTURING SLIDE FASTENER STRINGER WITH IMPROVED FASTENING ELEMENT COUNT

[75] Inventor: Jan Erik Sandgren, Meadville, Pa.
[73] Assignee: Textron, Inc., Providence, R.I.
[22] Filed: Oct. 20, 1975
[21] Appl. No.: 623,911

[52] U.S. Cl. .................................. 29/410; 29/407; 29/207.5 R; 112/104; 112/265
[51] Int. Cl.² .................. B21D 53/52; B21F 45/18; B29D 5/00
[58] Field of Search ....... 29/407, 408, 410, 207.5 R, 29/33.2, 208 C; 112/104, 265, 106; 139/11, 116, 35

[56] References Cited
UNITED STATES PATENTS

| | | |
|---|---|---|
| 2,661,044 | 12/1953 | Schewermann ................ 29/207.5 R |
| 2,942,336 | 6/1960 | Hansen .............................. 29/410 X |
| 3,070,048 | 12/1962 | Morin ............................... 29/410 X |
| 3,487,531 | 1/1970 | Cuckson et al. ............ 29/207.5 R X |
| 3,548,482 | 12/1970 | Graf....................................... 29/410 |
| 3,570,104 | 3/1971 | Jensen........................ 29/207.5 R X |

FOREIGN PATENTS OR APPLICATIONS

682,272   3/1964   Canada................................. 29/410

Primary Examiner—Victor A. DiPalma
Attorney, Agent, or Firm—O'Brien & Marks

[57] ABSTRACT

In the manufacture of a slide fastener stringer, the relative count of fastening elements per unit length of the tape of the stringer being manufactured is continuously monitored and used as a feedback control to adjust the relative rate of advancement of either a train of fastening elements or a stringer-tape-forming member.

22 Claims, 10 Drawing Figures

METHOD AND APPARATUS FOR MANUFACTURING SLIDE FASTENER STRINGER WITH IMPROVED FASTENING ELEMENT COUNT

BACKGROUND OF THE INVENTION

1. FIELD OF THE INVENTION

This invention relates to the manufacture of stringers for slide fasteners wherein a train of fastening locking elements is attached to one edge of each tape of the stringers.

2. DESCRIPTION OF THE PRIOR ART

The prior art contains a number of methods and apparatus for manufacturing slide fastener stringers wherein a train of fastening elements is secured to an edge of a tape such as by stitching the fastening elements to the edge of the tape; by bonding the fastening elements to the edge of the tape with ultrasonic energy, adhesives and the like; or by weaving the train of fastening elements to the edge of the tape during the formation of the tape from tape forming members such as weft and warp threads. U.S. Pat. No. 3,054,364 illustrates an apparatus for stitching a train of fastening elements to the edge of a tape.

In the prior art, the count or number of fastening elements per unit length of tape made in a continuous manufacturing operation often varies so that sections of the stringer cannot be mated with certain other opposite stringer sections without exhibiting undesirable curvature of the slide fastener chain, i.e., when a stringer with one fastening element count per unit length is mated with an opposing stringer with a different count per unit length, the chain formed by the stringers will have a curvature. The ability of stringers to mate with opposing stringers without exhibiting any significant curvature or other incompatability is called "scramble" ability.

In many of the prior art stringer manufacturing operations, the assembly of the fastening element trains and the stringer-tape-forming members, such as tapes or warp threads, is made while such stringer-tape-forming members are under tension. Variation in the stress/strain relationship or the elasticity of the stringer-tape-forming members causing variation in the fastening element count per unit length when the stringer is relaxed after assembly is a major obstacle to the scrambleability of stringers.

SUMMARY OF THE INVENTION

The invention is summarized in that a method of manufacturing a continuous stringer for a slide fastener includes advancing a continuous train of fastening elements to an assembly station, advancing a continuous stringer-tape-forming member to the assembly station, assembling the train of fastening elements and the stringer-tape-forming member at the assembly station to form a continuous stringer having a carrier tape with the fastening elements secured to one edge of the tape, advancing the continuous stringer from the assembly station, sensing the relative quantity of fastening elements per unit length of the tape in the stringer after the assembly station, and controlling the relative rate of advancement of one of the continuous train of fastening elements and the continuous stringer-tape-forming member to the assembly station in response to the sensing to produce a continuous stringer having a substantially predetermined quantity of fastening elements per unit length of tape.

An object of the invention is to manufacture a continuous slide fastener stringer having a constant number of fastening elements per unit length of the carrier tape.

Another object of the invention is to substantially reduce variation in fastening element count per unit length of a carrier tape due to variation in the strees-train relationship of the material constituting the tape-forming member during the manufacture or assembly of the slide fastener stringer.

It is also an object of the invention to provide for feedback control of the rate of feed or either a train of slide fastener elements or a stringer-tape-forming member to promote unifomity in the count of fastening elements on a continuous tape.

One advantge of the invention is that stringers may be scambled, i.e. may be interchanged with various other stringers in forming a chain for a slide fastener, without producing any substantial curvature of the slide fastener chain.

Other objects, advantages and features of the invention will become apparent from the following description of the preferred embodiments taken in conjunction with the accompanying drawings.

DESCRIPTION OF THE PREFERRED EMBODIMENTS

Figure 1:
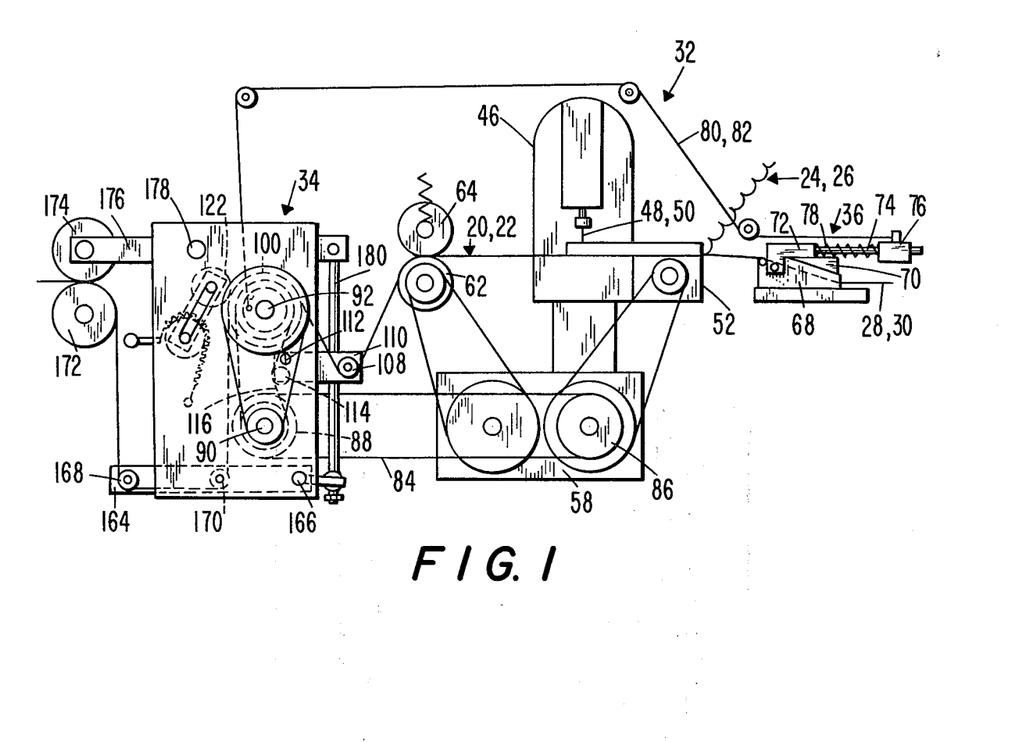
FIG. 1 is a diagrammatic front view of an apparatus for manufacturing a pair of slide fastener stringers in accordance with the invention.
Figure 2:
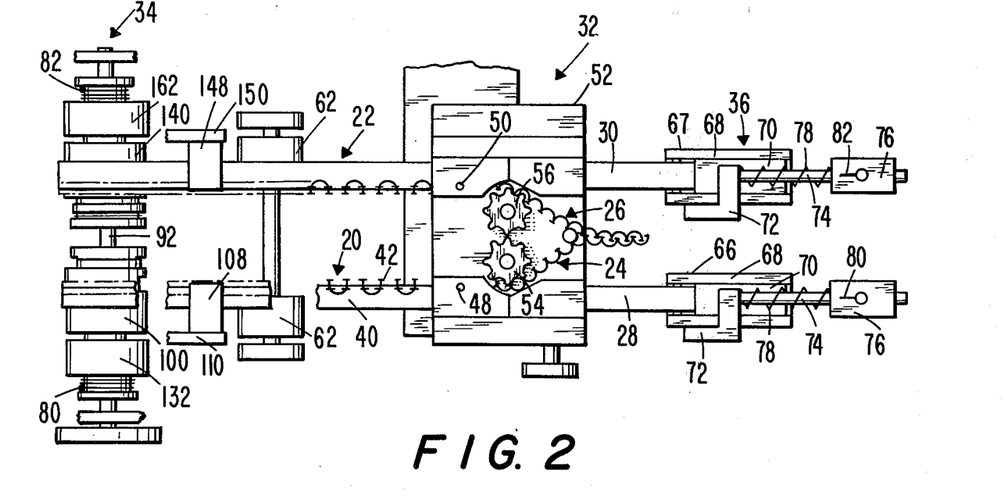
FIG. 2 is a diagrammatic top view of a lower portion of the apparatus of FIG. 1.

As illustrated in FIGS. 1 and 2, the invention is embodied and may be practiced by an apparatus for manufacturing a pair of continuous stringers indicated gererally at 20 and 22. The stringers 20 and 22 are formed from a pair of trains indicated generally at 24 and 26 of interlocking fastening elements and a pair of stringer-tape-forming members 28 and 30. The apparatus includes an assembly mechanism indicated generally at 32 forming an assemblly station for assembling the trains 24 and 26 and the stringer-tape-forming members 28 and 30 into the stringers 20 and 22, a sensing mechanism indicated generally at 34 for sensing the number of fastening elements per unit length of the stringer, and a control mechanism indicated generally at 36 for controlling the relative rate of advancement of the stringer-tape-forming members 28 and 30 and the trains 24 and 26 of fastening elements to the assembly station 32 in response to the sensing station 34.

The stringers 20 and 22 each consist of basically two parts, a tape 40 and a row of fastening elements 42 attached to an inner edge of the tape 40 wherein the fastening elements are designed to interlock with fastening elements of an opposed stringer. The tapes 40 are flexible and selected for their longitudinal stability; for example the tapes 40 can be a conventional tape such as a fabric tape. The fastening elements 42 can be formed from a continuous monofilament plastic material bent, coiled or deformed in a conventional manner so as to form interlocking teeth, or the fastening elements 42 can be conventional molded or cast scoops which may be joined by one or more connecting strands. For the apparatus of FIGS. 1 and 2 the stringer-tape-forming members 28 and 30 and thus the tapes of the stringers 20 and 22 have at least a slight elasticity or stress/strain relationship which produces elongation when under tension and shrinkage in the longitudinal dimension when the tension is released.

In the specific apparatus illustrated in FIGS. 1 and 2, the assembly mechanism 32 includes a sewing machine 46 having a pair of sewing needles 48 and 50 together with a fastening element feeding and tape guiding mechanism 52 having a pair of toothed wheels 54 and 56 for advancing the fastening elements 42 of the trains 24 and 26. A motor driven gear box 58 is suitably connected, such as by chains, cog timing belts, or the like to the sewing machine 46, the feeding mechanism 52 and pull off wheels 62 over which the tapes 40 of the respective stringers 20 and 22 pass. Respective spring biased nippling rollers 64 are biased toward the pull off wheels 62 to grip the tapes 40 and thus to pull the stringers 20 and 22 through the assembly mechanism 32. The fastening element feeding and tape guiding mechanism is designed to feed the fastening elements of the trains 24 and 26 in synchronism with the operation of the sewing machine and in proper relationship to edges of the tapes 28 and 30 so as to stitch leg portions of the fastening elements to the tapes.

The control mechanism 36 includes a pair of brake mechanisms 66 and 67 suitable for producing tension in the tapes 28 and 30 as they are advanced through the assembly station 32. Each of the brake mechanisms 66 and 67 includes a lower brake shoe 68 below the respective tapes 28 and 30 and an upper brake shoe 70 above the tapes 28 and 30. The upper brake shoes 70 are mounted on respective lever members 72 pivoted on the portions 68. Respective rods 74 extend from levers 72 and have respective weights 76 slidable thereon such as to allow for variation of the friction force of the brake shoes 68 and 70 on the tapes 28 and 30. Compression springs 78 are interposed between the respective weights 76 and the levers 72 to urge the weights 76 outward while control cables 80 are 82 are connected between the weights 76 of the respective brake mechanisms 66 and 67 and the sensing mechanism 34 for controlling the position of the weights 76.

Figure 3:
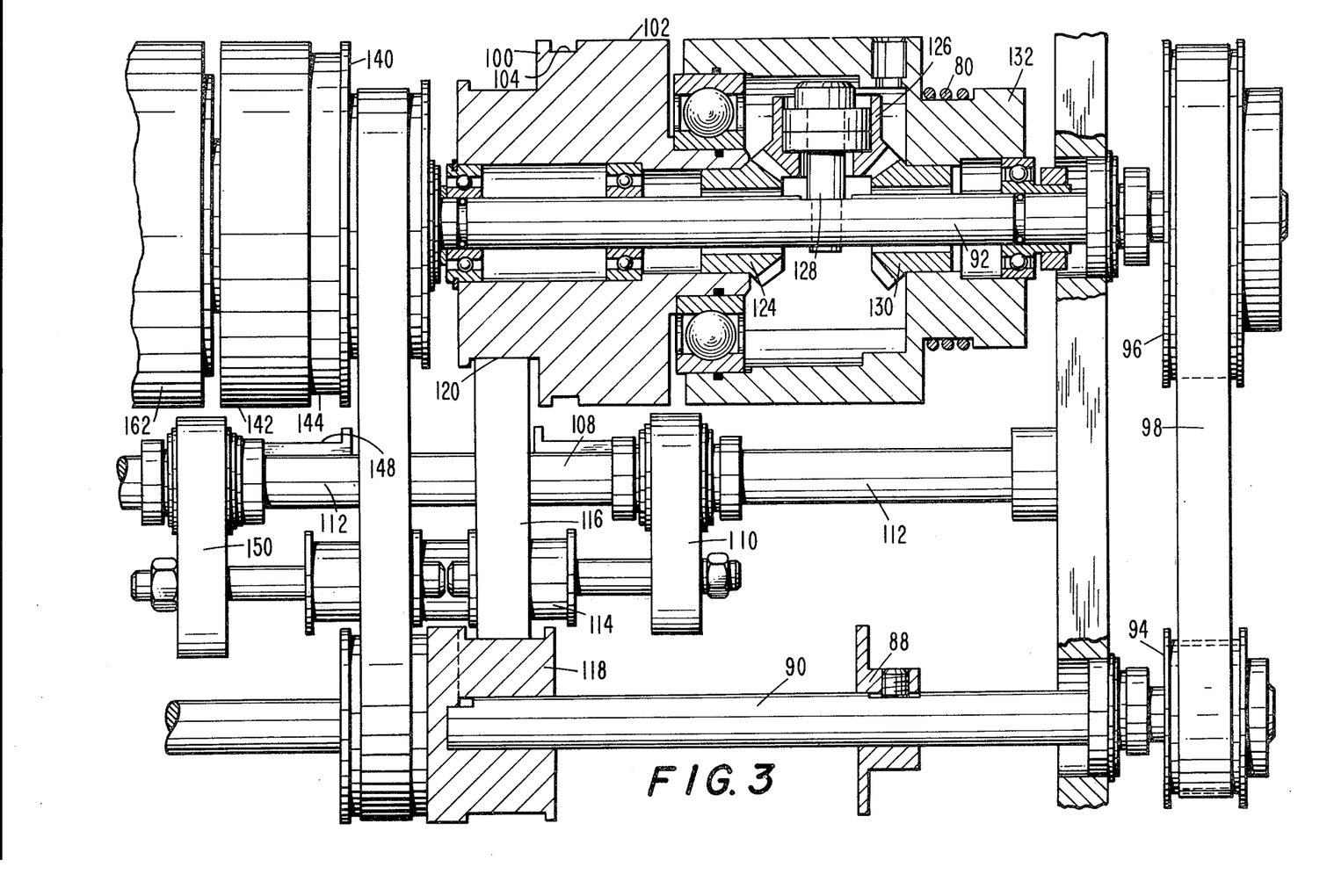
FIG. 3 is a side cross-section view of one portion of a sensing mechanism of the apparatus of FIG. 1.

In the sensing mechanism 34 a chain 84 or the like meshes with a gear 86 on the gear box 58 and meshes with a gear 88 attached to a shaft 90 in the sensing mechanism 34, to drive the sensing mechanism 34 in synchronism with the sewing mechanism 46 and the fastening element feeding mechanism 52. As shown in FIG. 3, the shaft 90 is connected with a shaft 92 by a pulley 94 fixed on the shaft 90, a pulley 96 fixed on the shaft 92, and a belt 98 passing over the pulleys 94 and 96. A measuring wheel 100 is rotatably mounted on the shaft 92 and has a peripheral portion 102 for being engaged by the tape portion 40 of the stringer 20. A channel 104 is formed in the peripheral portion 102 such as to prevent engagement of the fastening elements 42 with the measuring wheel 100 interfering with measurement of the length of the tape 40. As illustrated in FIG. 1, the stringer 20 passes under a pulley 108 between the pulloff wheel 62 and the measuring wheel 100. The pulley 108 is mounted on an arm 110 pivotally mounted on an intermediate shaft 112, FIG. 3. An idle pulley 114 is mounted on the arm 110 spaced from the shaft 112 so as to normally engage and tighten, under the weight of the arm 110, a belt 116 which passes over a pulley 118 mounted on the shaft 90 and a pulley portion 120 of the measuring wheel 100. The pulley 108 is mounted on the arm 110 so as to loosen the belt 116 under slight tension in the stringer 20 to maintain a predetermined length of stringer 22 between the wheel 62 and the measuring wheel 100 and to maintain a low constant tension in the stringer 20 between the pulloff wheel 62 and the measuring wheel 100; the low constant tension being substantially less than the tension in the stringer-tape-forming member 28 between the brake mechanism 66 and the pulloff wheel 62. The peripheral portion 102 of the measuring wheel 100 is preferably provided with a suitable gripping surface to help prevent slippage of the tape 40 relative to the surface 102 for example, the peripheral portion 102, FIG. 1, may be provided with a knurled surface. Additionally, a spring biased nipping roller 122 is provided to maintain secure gripping engagement of the tape portion 40 against the measuring wheel 100 and to prevent tape slippage of the tape 40 on the peripheral portion 102. The gears 86 and 88, the pulleys 94 and 96, and the diameter of the measuring wheel 100 at the peripheral portion 102 are selected such that the measuring wheel 100 is driven at a speed which has a predetermined ratio to the speed of the shaft 92 when the stringer 20 has a predetermined number or count of fastening elements 42 per unit length of tape 40; for the mechanism of FIG. 3 the measuring wheel 100 is driven at an angular velocity which is twice the angular velocity of the shaft 92 at the predetermined ratio. The pulley 118 and the pulley portion 120 are selected so as to drive the measuring wheel 100 at a substantially greater velocity than the velocity corresponding to the predetermined ratio when the belt 116 is tightened.

The sensing mechanism 34 is provided with a differential such as an epicyclic gear train including bevelled gear portion 124 fired on the measuring wheel 100, an orbital bevelled gear 126 rotatably mounted on a cross shaft 128 mounted at right angles to the shaft 92, and a bevelled gear portion 130 fixed on a control drum 132 which is rotatably mounted on the shaft 92. The differential is such that it senses any variation in the rotation of the measuring wheel 100 from the predetermined ratio with respect to the shaft 92. The control cable 80 is fixed at one end to the control drum 132 to transmit motion corresponding to such difference to the control mechanism 36 for controlling the tension in the stringer-tape-forming member 28 being advanced to the assembly mechanism 32.

The sensing mechanism 34 also has a measuring wheel 140 including a peripheral portion 142 for engaging the tape of the stringer 22 and including a channel 144 for receiving the fasterning elements of the stringer 22. The measuring wheel 140 is rotatably mounted on the shaft 92 and is substantially similar to the measuring wheel 100. The stringer 22 passes under a pulley 148, FIG. 2., rotatably mounted on an arm 150 which is pivoted on the shaft 112 and which has an idle pulley 154 mounted thereon for selectively controlling the tension of a belt 156 passing over a pulley portion 160 of the measuring wheel 140 and the pulley 118. A control drum 162 similar to the control drum 132 is also rotatably mounted on the shaft 92 and is drivenly connected by a differential (not shown-but similar to the differential connecting the shaft 92, measuring wheel 100 and control drum 132) to the shaft 92 and the measuring wheel 140 for sensing and integrating any variation in the angular velocity of the measuring wheel 140 from the predetermined ratio with the angular velocity of the shaft 92. The control cable 82 is fixed at one end on the control drum 162.

A lever 164, FIG. 1, is pivotally mounted at 166 in the mechanism 34 and has a pair of guide rollers 168 and 170 for directing the stringer 20 from the measuring wheel 100 to a pull-off wheel 172. The pull wheel 172 is driven at a speed slightly higher than the speed of the stringer 20 when it has the predetermined count or number of fastening elements per unit length of tape. A nipping roller 174 is mounted on one end of a lever 176 which is pivoted at an intermediate point 178 and has its other end connected by connecting rod 180 to the other end of the lever 164 such that an increase in the tension of the stringer 20 over the rolles 168 and 170 in the sensing mechanism causes a reduction in the force on the nipping roller 174 thus reducing the gripping force of the pull-off wheel 172 and maintaining the tension of the stringers 20 over the rollers 168 and 170 at relatively low constant tension. A substantially similar provision (not shown) is made for maintaining the constant low tension in the stringer 22 as it passes from the measuring wheel 140.

In operation of the apparatus of FIGS. 1, 2 and 3, the trains of fastening elements 24 and 26 together with the stringer-tape-forming members 28 and 30 are advanced to the assembly mechanism 32 where the fastening elements of the trains 24 and 26 and the members 28 and 30 are assembled to form the stringers 20 and 22. The sensing mechanism 34 senses the relative number of fastening elements per unit length of the tapes 40 of the stringers 20 and 22 and operates the control mechanism 36 to control the relative rates of feed of the trains 24 and 26 and the stringer-tape-forming members 28 and 30 to thus produce a substantially constant number or count of fastening elements 42 per unit length of tape 40 in the stringers 20 and 22.

More specifically with respect to the particular apparatus described in FIGS. 1—3, the trains of fastener elements 24 and 26 are fed by the toothed wheels 54 and 56, in synchronism with operation of the sewing machine 46, over the edge of the tapes 26 and 30 and beneath the needles 48 and 50 whereupon stitches are formed securing the leg portions of the fastening elements 42 to the tapes 40. The tapes 40 are pulled through the sewing machine 40 by the pull wheels 62 under tension provided by the brakes 66 and 67 on the stringer-tape-forming-members 28 and 30. After passing through the pull wheels 62 the stringers 20 and 22 pass underneath the respective rollers 108 and 148 and over the respective measuring wheels 100 and 140. The nipping rollers 120 as well as the knurled surface of the portions 102 and 142 of the rollers 100 and 140 insure that the measuring wheels 100 and 140 do not slip with respect to the tapes 40 of the stringers 20 and 22. The shaft 92 is driven at an angular velocity which corresponds to the speed of the feed wheels 54 and 56 feeding the fastening elements of the trains 24 and 26 while the measuring wheels 120 and 140 have an angular velocity which corresponds to the length of the tape of the respective stringers 20 and 22 passing over the measuring wheels 120 and 140 in a relatively untensioned state. When the angular velocity of one or both of the measuring wheels 120 and 140 varies from the predetermined ratio (i.e. 2 to 1) with the speed of the shaft 92, the control drum rotates to move the respective control wires 80 and 82 advancing or retracting the respective weights 76 on the rods 74 to thus reduce or increase the tension in the respective stringer-tape-forming members 28 and 30. A change in tension in the stringer-tape-forming members 28 and 30 results in elongation or reduction in elongation of the tape forming members thus changing the relative number or count of fastening elements attached by the assembling mechanism 32 per unit length of the tapes 40.

When the number of fastening elements per unit length of the tape in the stringer 20 is greater than the predetermined number, the length of tape 40 passing over the measuring wheel 100 causes the wheel 100 to rotate at less than twice the rotational speed of the shaft 92 resulting in the pinion 126 rotating the drum 132 counterclockwise as viewed in FIG. 1 to move the control cable 80 to the left thus moving the weight 76 on the rod 78 to the left to reduce the friction force of the brake shoes 68 and 70 on the stringer-tape forming member 28. When the tension in the stringer-tape-forming member 30 is reduced, the member 28 is elongated less resulting in less fastening elments being secured in the assembly mechanism 32 per unit length on the tape 40. Conversely if the stringer 20 has less than the predetermined number of fastening elements per unit length of the tape 40, the measuring wheel 100 will rotate at a speed greater than twice the rotational speed of the shaft 92 causing the pinion 126 to rotate the control drum 132 clockwise as viewed in FIG. 1 to slacken the control cable 80 allowing the spring 78 to push the weight 76 to the right on the shaft 74 thus increasing the force on the brake shoe 70 and the tension in the stringer-tape forming member 28. With increased tension in the stringer-tape-forming member 28 additional stretching occurs causing more fastening elements per unit length of tape to be assembled on the tape 40.

The stringers 20 and 22 in the sensing mechanism 34 are maintained in substantially an untensioned state or under a low constant tension; since the apparatus maintains the low tension in both stringers in the same manner only the maintenance of low tension is the stringer 20 will be discribed. The low tension in the stringer 20 is maintained by the action of the roller 108 on the lever 110 and the roller 168 and 170 on the lever 164. If the stringer 20 between the pull off roller 62 and the measuring wheel 100 becomes too slack, the lever 110 slightly pivots under its own weight about the shaft 112 moving the idle pulley 114 to tighten the belt 116 and thus drive the measuring wheel 100 at a speed greater than twice the speed of the shaft 92; thus the slack in the stringer 20 between the pull wheel 62 anad the measuring wheel 100 is taken up. Conversely when the stringer 20 increases in tension about the roller 108, the tension in the stringer 20 causes the lever 110 to pivot slightly and release the belt 116 allowing slippage of one of the pulleys 118 and 120 with respect to the belt 116 to thus maintain the low constant tension in the stringer 20 between the wheels 62 and 100. The lever 164 is pivoted clockwise from excessive tension in the stringer between the measuring wheel 100 and the pull wheel 172 and is pivoted counter clockwise by its weight when the stringer between wheels 100 and 172 become to slack. The clockwise and counterclockwise motion of the lever 164 is transferred to the lever 176 by the connecting rod 180 to decrease and increase, respectively, the force of the nipping roller 174 gripping the stringer 20 against the pull wheel 172 to cause more or less slippage of the pull wheel 172 with respect to the stringer 20 to maintain the constant low tension in the stringer 20 passing under the rollers 168 and 170.

It is noted that the output of the sensing mechanism 34 (i.e. the movement of the cables 80 or 82) represents an integration of the sensed variation; thus oscillation of the control mechanism is prevented since a corrected tension on the stringer-tape-forming members 28 and 30 will be maintained until another variance is sensed by the sensing mechanism 34.

Figure 4:
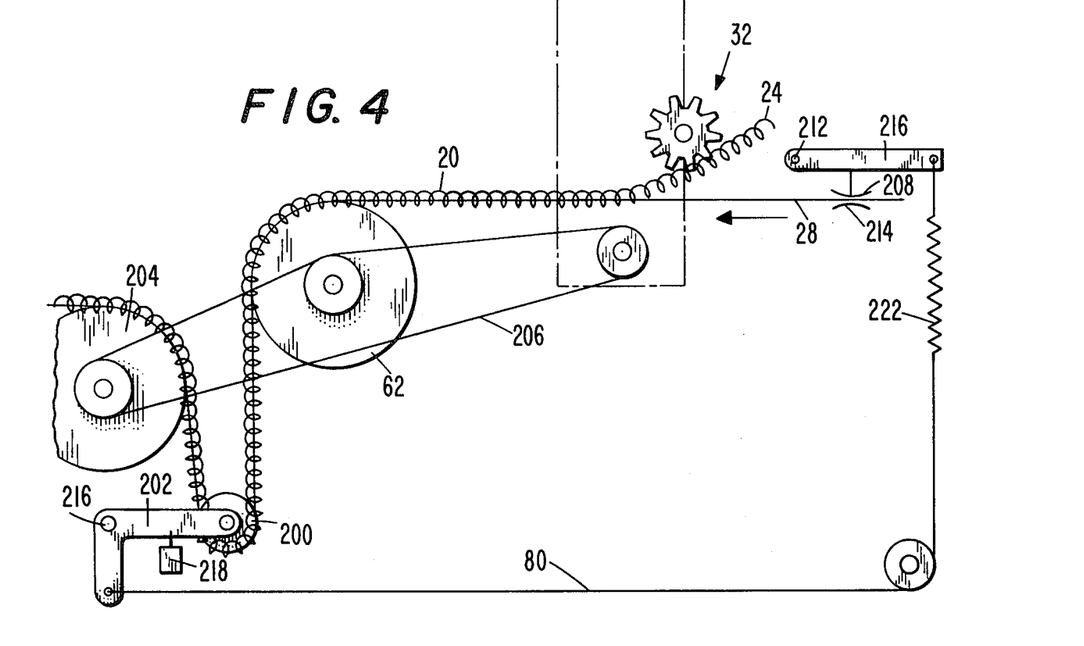
FIG. 4 is a schematic of a second variation of the apparatus for manufacturing a stringer in accordance with the invention.

A variation, as illustrated in FIG. 4, of the apparatus for manufacturing a stringer 20 from the train 24 of fastening elements and stringer-tape-forming member 28 includes a roller 200 rotatably mounted on the end of a horizontally extending arm of an L-shaped lever 202. The pull wheel 62 and a measuring wheel 204 are driven by a belt or chain 206 in synchronism with the assembly mechanism 32 which is such that it assembles the train of fastening elements 24 together with the stringer tape forming member 28 to form the stringer 20. The lever 202 is pivoted at its elbow 216 and has a vertically extending arm which is connected to the control cable 80 joined by a tension spring 222 to one end of a lever 210. A movable brake shoe 208 is attached to the lever 210 which at its other end 212 is connected to a pivot. The movable brake shoe 208 cooperates with a stationary brake shoe 214 such as to provide tension in the tape forming member 28 as it passes through the assembly station 32 to the feed roll 60. The stringer 20 passes over the wheels 62 and 204 forming a loop passing under the roller 200. A weight 218 mounted on the horizontal arm of the lever 202 is selected to load the spring 222 and to produce a low tension in the stringer 20 between the wheels 62 and 204.

In operation of the apparatus of FIG. 4 the tape forming portion 28 is maintained in tension between the brake shoes 208 and 214 and the pull wheel 62 as the train of fastening elements is fed and assembled to the stringer-tape-forming member to form the stringer 20. Since the measuring wheel 204 and the pull wheel 62 are driven in synchronism with the assembly apparatus 32 and particularly the feeding of the train of fastening elements 24, a constant number of fastening elements are maintained between the pull wheel 62 and the measuring wheel 204. Any variation in the number of fastening elements secured to the tape forming member per unit length results in the length of tape supporting the fastening elements between the pull wheel 62 and the measuring wheel 204 to shorten or lengthen thus moving the roller 200 to pivot the lever 202 and move the cable 80 either increasing or decreasing the mount of friction force supplied by the brake shoes 208 and 214 to the stringer-tape-forming member 28. More particularly, when the number of fastening elements per unit length of th tape of stringer 20 is greater than a predetermined number, the loop of the stringer 20 between the pull wheel 62 and the measuring wheel 204 will shorten causing the roller 200 to raise against the force of the weight 218 which results in the cable 80 reducing the tension in the spring 222 to reducing the amount of friction from the shoes 208 and 214 on the stringer-tape-forming member 28. Thus the stringer-tape-forming member 28 is stretched less since it is under less stress from the brake shoes 208 and 214 to result in less fastener elements from the trains 24 to be assembled in the assembly station 32 per unit length of the stringer-tape-forming member 28. Conversely if the number of fastening elements per unit length on the stringer 20 is less than the predetermined number, the length of the stringer between the pull wheel 62 and the measuring wheel 204 increases to allow roller 200 to lower under the force of the weight 218 to move the cable 80 to increase the tension of the spring 222 and thus increase the friction of the brake shoes 208 and 214 on the stringer-tape-forming member 28 producing increased stretching of the stringer-tape-forming member 28 as it passes through the assembly apparatus 32 to thus increase the number of fastening elements assembled by the assembly apparatus 32 per unit length of the tape of the stringer 20 when it subsequently becomes relaxed and returns to an unstretched state.

Figure 5:
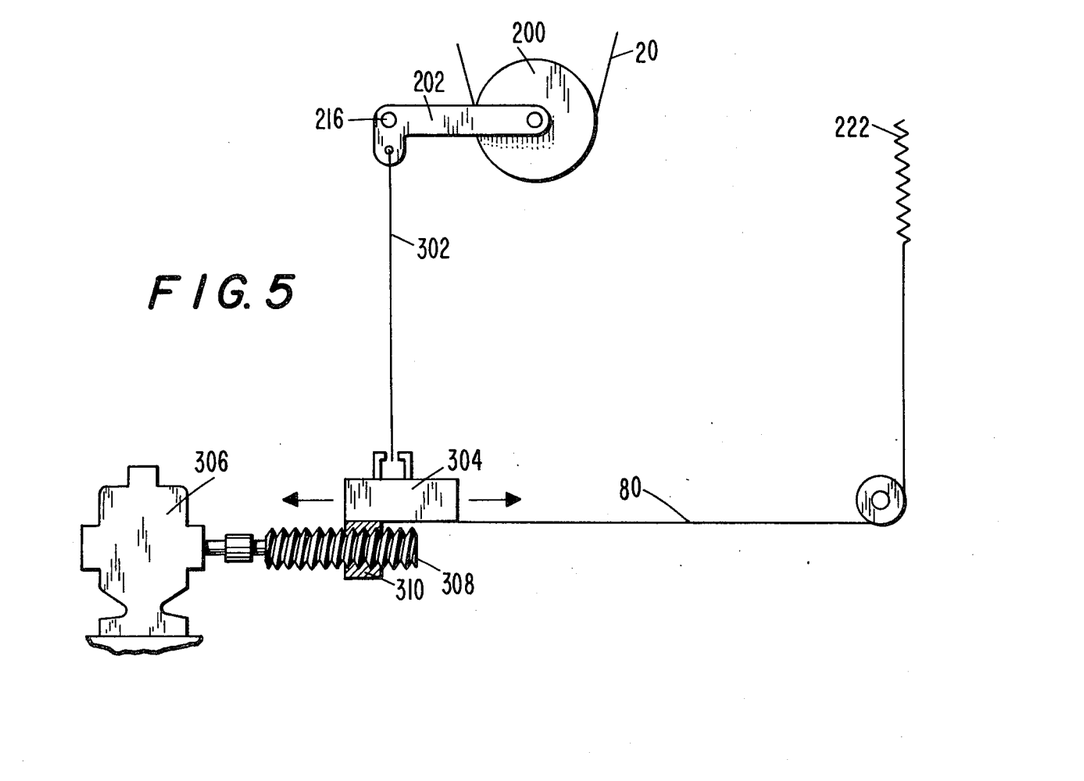
FIG. 5 is a schematic of a modification of the sensing mechanism in the variation of FIG. 4.
Figure 6:
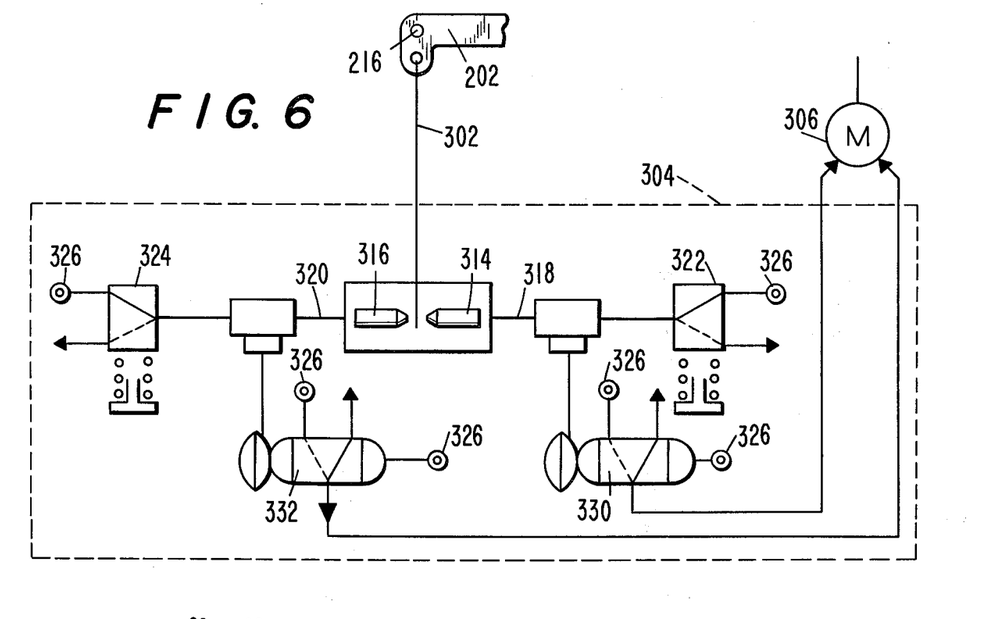
FIG. 6 is a detail schematic of a portion of the sensing mechanism of FIG. 5.

A modification of the variation of FIG. 4 is shown in FIGS. 5 and 6, and includes a needle or vane 302 secured to the lever 202 and extending from the pivot point 216 to a pneumatic sensor unit 304. A reversable motor 306 controlled by the sensor 304 is drivenly connected to a feed screw 308 threaded in a nut portion 310 of the sensor unit 304 for linearly moving the sensor unit 304. The sensor unit 304 is connected to the cable 80 to move the cable 80 in the same manner as the lever 202 of the variation in FIG. 4. The sensor unit 304 as shown in FIG. 6 includes a pair of opposed air jet openings 314 and 316 positioned on opposite sides of the needle 302 and communicating with respective lines 318 and 320 through manual valves 322 and 324 to an air source 236. Diaphragm operators of respective diaphragm valves 330 and 332 are connected by T-couplings to the lines 318 and 320 such that the diaphragm valves 330 and 332 will be operated if the needle 302 moves sufficiently close to the respective jet opening 314 and 316 to back up the air pressure within the lines 318 and 320. The diaphragm valves 330 and 332 are then connected to respective reverse and forward inputs of the reversable motor 306.

In operation of the modification of FIG. 5 and 6, the movement of the roller 200 indicating variation from the predetermined count of fastener elements per unit length of the stringer 20, results in movement of the needle 302 blocking one of the jets 314 and 316 causing the pressure to build up in the respective line 318 or 320 to operate the respective diaphragm valve 330 or 332. Air from the operated valve 330 or 332 operates the motor 306 to move the sensor unit 204 such as to center the needle 302 between the jets 314 and 316. The movement of the sensor unit 304 results in movement of the cable 80 and change in the tension of the spring 222 to thus change the tension in the stringer tape forming member and cause more or less fastener elements to be assembled per unit length of stringer as previously mentioned.

Figure 7:
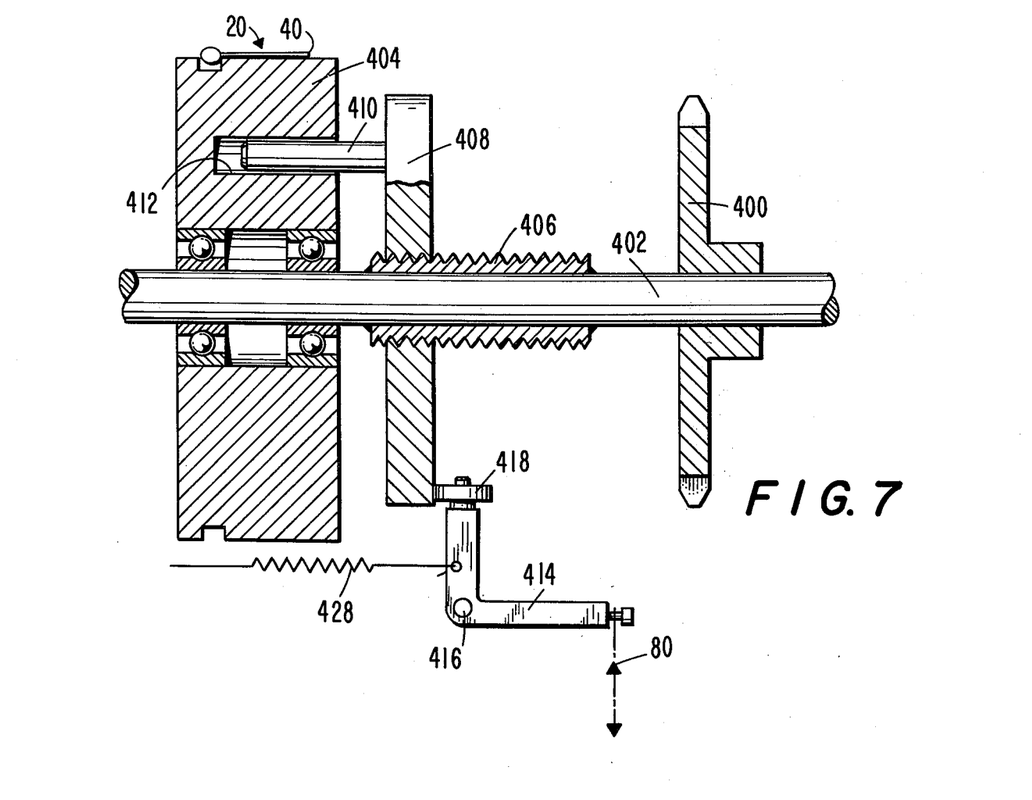
FIG. 7 is a schematic of a modification of the sensing mechanism of the apparatus of FIGS. 1–3.

Another modification of the differential sensing mechanism is illustrated in FIG. 7 wherein a gear sprocket 400 is fixed on a shaft 402 to be driven by a chain in synchronism with the assembly mechanism and the rate of feed of the fastening elements. A measuring wheel 404 is rotatably mounted on the shaft 402 and has a periphery portion for engaging the tape portion 40 of the stringer 20 in a relaxed or untensioned state to be rotated at a rate in accordance with the rate of advancement of the tape portion 40 while in an untensioned state. A threaded portion 406 is mounted on the shaft 402 and is threadably engaged by a disc member 408 which has a pin 410 extending into a bore 412 formed in the wheel 404 such as to lock the member 408 for rotation with the measuring wheel 404. An arm 414 pivotally mounted at 416 has a cam follower 418 at one end which is biased by a spring 428 against the member 408 to sense movement of the member 408 longitudinally relative to the shaft 402. The arm 414 is connected to the control cable 80 which controls the tension of the stringer-tape-forming member.

In operation of the modification of FIG. 7 the shaft 402 and the measuring wheel 404 are rotated at the same velocity when the stringer 20 in its relaxed state has the predetermined number of fastening elements per unit length thereof. When the number of fastening elements per unit length is greater or less than the predetermined number, the measuring wheel 404 and member 408 rotate slower or faster than the shaft 402 and threaded portion 46 causing longitudinal displacement of the member 408 on the portion 406 resulting in movement of the arm 414 and the cable 80 to thus return the count of fastening elements being applied per unit length of stringer tape to the predetermined value.

Figure 8:
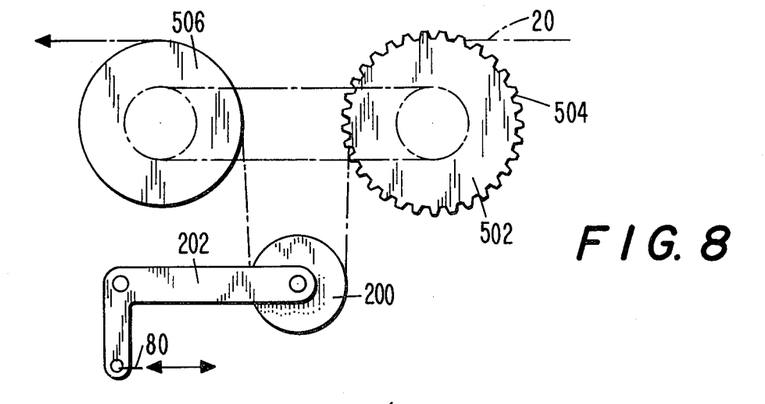
FIG. 8 is a schematic of another modified sensing mechanism suitable for substitution in the apparatus of FIGS. 1–4.

A further modified sensing mechanism is illustrated in FIG. 8 and includes a wheel 502 having teeth 504 for engaging the fastening elements on the stringer 20. A wheel 506 is connected with the wheel 504 to be driven at the same speed and has a periphery portion for engaging and being driven by the tape portion of the stringer 20. The roller 200 engages a loop of the stringer 20 between the rollers 502 and 506 to thus sense any variation in the rate of feed of the fastening elements over the wheel 504 to the rate of feed of the tape portion over the wheel 506.

Figure 9:
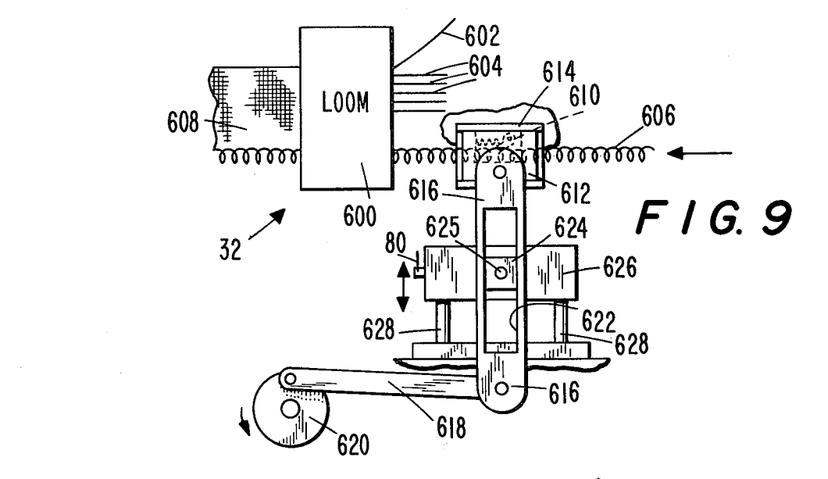
FIG. 9 is a schematic of a portion of another variation of the apparatus for manufacturing a slide fastener stringer in accordance with the invention.
Figure 10:
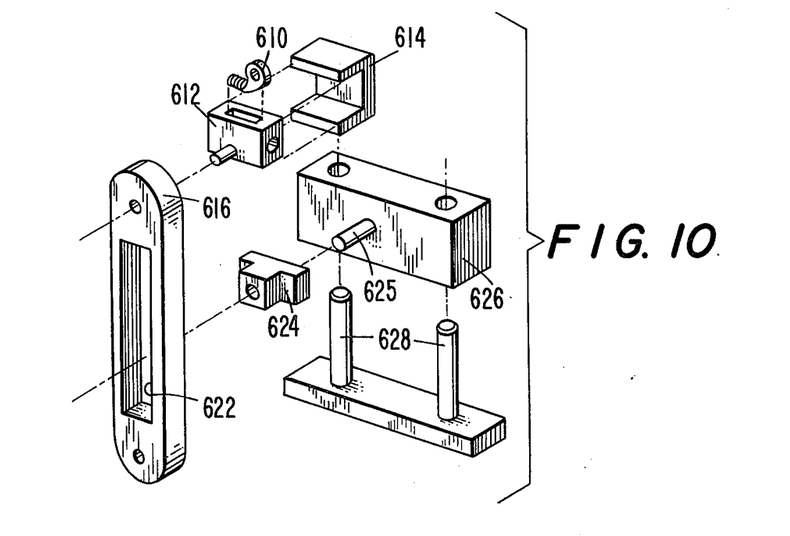
FIG. 10 is a perspective view of a dissassembled advancing mechanism of the apparatus of FIG. 9.

A further variation, shown in FIGS. 9 and 10 of the apparatus of manufacturing a stringer includes a loom 600 for interweaving a weft thread 602 with a plurality of stringer-tape-forming members or warp threads 604 and a train 606 of fastener elements to form the stringer 608. The train 606 may be for example a spiral coil of continuous filament suitably formed to form the fastening elements. The train 606 is fed to the loom 600 by a spring biased pawl 610 engaging the train 606 with a passageway formed through a slide block 612 slidably mounted within a channel of a stationary guide 614. The slide block 612 is pivotally connected to one end of a lever 616 which has its other end connected to a link 618 extending transversely to a pivot point on a rotating eccentric 620. The lever 616 has a longitudinal slot 622 formed therein which slidably receives a block 624 which is pivotallly mounted on a pin 625 fixed to a block 626 slidably mounted on slide rods 628 generally longitudinally of the lever 616. The control cable 80 is attached to the block 626 to move the block 626 and thus the fulcrum point for the lever 616.

In operation of the variation of FIGS. 9 and 10 the eccentric 620 causes the lever 616 to oscillate about the fulcrum point 625 causing the slide block 612 to move to and fro within the guide 614. During advancement of the block 612 the pawl 610 engages the train 606 while during retraction of the block 612 and pawl 610 disengages the train 606 allowing the train 606 to slide with respect to the block 612 through the passageway therein. The rate of feed of the train of fastener elements 606 is varied by movement of the control cable 80 to move the block 626 thus changing the fulcrum point 625 and thus changing the length of stroke of the block 612 resulting in a change in the feed rate of the train 606 of fastener elements.

Since many variations, modifcations and changes in detail may be made to the described embodiments it is intended that all matter in the foregoing description and shown in the accompanying drawings be interpretted as illustrative and not in a limiting sense.

I claim:
1. A method of manufacturing a continuous stringer for a slide fastener comprising
    advancing a continuous train of fastening elements to an assembly station,
    advancing a continuous stringer-tape-forming member to the assembly station,
    assembling the train of fastening elements and the stringer-tape-forming member at the assembly station to form a continuous stringer having a carrier tape with the fastening elements secured to one edge of the tape,
    advancing the continuous stringer from the assembly station,
    sensing the relative quantity of fastening elements per unit length of the tape in the stringer after the assembly station, and
    controlling the relative rate of advancement of one of the continuous train of fastening elements and the continuous stringer-tape-forming member to the assembly station in response to the sensing to produce a continuous stringer having a substantially predetermined quantity of fastening elements per unit length of the tape.

2. A method as claimed in claim 1 wherein the member advancing step includes advancing the stringer-tape-forming member to the assembly station in an elastic stretched condition under tension, and
    the controlling step includes controlling the tension on the stringer-tape-forming member.

3. A method as claimed in claim 1 including applying a first tension to the stringer-tape-forming member during the assembling of the train of fastening elements and the stringer-tape-forming member, and applying a constant low tension substantially less than the first tension to the stringer during the sensing step.

4. A method as claimed in claim 1 wherein the sensing includes rotating a first member in accordance with the rate of advancement of the fastening elements, rotating a second member in accordance with the rate of advancement of the tape of the stringer, and sensing a variance from a predetermined ratio of the rotation of the first member to the rotation of the second member to control the relative rate of advancement of one of the continuous train of fastening elements and the stringer-tape-forming member.

5. A method as claimed in claim 1 wherein the rate of advancement of the continuous train of fastening elements is controlled in response to the sensing.

6. A method as claimed in claim 5 wherein the continuous train of fastening elements is advanced by increments to the assembling station and the magnitude of incremental advancement is controlled to control the rate of advancement of the continuous train of fastening elements.

7. A method as claimed in claim 1 wherein the continuous stringer-tape-forming member is a tape and the assembling step includes stitching the fastening elements to an edge of the tape.

8. A method as claimed in claim 1 wherein the continuous stringer-tape-forming member includes a plurality of warp threads, and the assembling step includes interweaving a weft thread with the plurality of warp threads and the train of fastening elements to form a carrier tape with the fastening elements secured to the edge of the carrier tape.

9. An apparatus for manufacturing a continuous stringer for a slide fastener comprising means for assembling a continuous train of fastening elements and a continuous stringer-tape-forming member into a continuous stringer having a carrier tape with the fastening elements secured to one edge of the tape, first means for advancing the continuous train of fastening elements to the assembly means, second means for advancing the continuous stringer-tape-forming member to the assembly means, means for sensing the relative quantity of fastening elements per unit length of the carrier tape in the stringer, and means responsive to the sensing means for controlling one of the first and second advancing means to produce a substantially predetermined quantity of fastening elements per unit length of the carrier tape.

10. An apparatus as claimed in claim 9 wherein the second means includes means for advancing the continuous stringer-tape-forming member in an elastic stretched condition under tension to the assembly means, and the means includes means for controlling the tension on the stringer-tape-forming member.

11. An apparatus as claimed in claim 10 wherein the controlling means includes brake means for applying tension to the stringer-tape-forming member and the controlling means includes means for varying the frictional force of the brake means on the stringer-tape-forming member.

12. An apparatus as claimed in claim 10 including means for applying a constant low tension to the stringer while being sensed by the sensing means, said constant low tension being substantially less than the tension of the stringer-tape-forming member at the assembly means.

13. An apparatus as claimed in claim 9 wherein the sensing means inclues a first rotatable member, means for driving the first member at a speed in accordance with the rate of advancement of the continuous train of fastening elements, a second rotatable member, means for driving the second rotatable member at a speed in accordance with the rate of advancement of the slide fastener tape, and means for sensing a variance from a predetermined ratio of the rotation of the first rotatable member to the rotation of the second rotatable member for operating the control means to control the relative rate of advancement of one of the trains of fastening elements and the stringer-tape-forming member.

14. An apparatus as claimed in claim 13 wherein the means for sensing the variance includes an epicyclic train having first, second and third parts, said first and second parts being driven by the respective first and second rotatable members, said third part being driven in accordance with the variance from the predetermined ratio of the rotation of the first rotatable member to the rotation of the second rotatable member; and the controlling means includes a control cable connected to the third member.

15. An apparatus as claimed in claim 14 wherein the assembling means includes means for stitching the continuous train of fastening elements to one edge of a tape; and said stitching means including means for operating the first advancing means in synchronism with the stitching means; and means for operating the first rotatable member driving means in synchronism with the stitching means.

16. An apparatus as claimed in claim 13 wherein the means for driving the second rotatable member includes wheel means engaging the carrier tape of the stringer for being driven in accordance with the speed of movement of the carrier tape.

17. An apparatus as claimed in claim 9 wherein the sensing means includes first wheel means engaging the carrier tape of the stringer for advancing the stringer from the assembly means, and second wheel means engaging the carrier tape at a point spaced from the first wheel means, said first wheel means being driven in synchronism with the first advancing means.

18. An apparatus as claimed in claim 17 wherein said second wheel means is also driven in synchronism with the first advancing means, the second advancing means includes means for advancing the continuous stringer-tape-forming member in an elastic stretched condition under tension through the assembly means to the first wheel means, and the sensing means includes means for sensing the length of tape between the first and second wheel means under substantially less tension than the tension on the stringer-tape-forming member in the assembly means.

19. An apparatus as claimed in claim 18 wherein the means for sensing the length of tape includes a moveable wheel means engaging a loop in the stringer between the first and second wheel means, and the controlling means includes means operated by the moveable wheel means.

20. An apparatus as claimed in claim 9 wherein the sensing means includes first wheel means with teeth for engaging the fastening elements of the stringer, second wheel means engaging the carrier tape of the stringer at a point spaced from the wheel means, means for rotating said first and second wheel means in synchronism, and means for sensing the length of tape between the first and second wheel means.

21. An apparatus as claimed in claim 9 wherein the first advancing means includes means for incrementally advancing the continuous train of fastener elements to the assembly means, and the controlling means includes means responsive to the sensing means for varying the magnitude of incremental advancement of the first advancing means.

22. An apparatus as claimed in claim 21 wherein the means for incrementally advancing the continuous train of fastener elements includes a pivotally mounted lever and means for oscillating the lever through an angle, and the means for varying the magnitude of incremental advancement includes means for varying the incremental distance between the oscillating means and a pivot point for the lever.

* * * * *